(12) United States Patent
Sasao (10) Patent No.: US 11,018,588 B2
(45) Date of Patent: May 25, 2021

(54) DC/DC CONVERTER

(71) Applicant: Sony Interactive Entertainment Inc., Tokyo (JP)

(72) Inventor: Kazuki Sasao, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 16/309,167

(22) PCT Filed: Jun. 7, 2016

(86) PCT No.: PCT/JP2016/066960
§ 371 (c)(1),
(2) Date: Dec. 12, 2018

(87) PCT Pub. No.: WO2017/212554
PCT Pub. Date: Dec. 14, 2017

(65) Prior Publication Data
US 2020/0099304 A1 Mar. 26, 2020

(51) Int. Cl.
*H02M 3/158* (2006.01)
(52) U.S. Cl.
CPC .. *H02M 3/1584* (2013.01); *H02M 2003/1586* (2013.01)
(58) Field of Classification Search
CPC .................. H02M 3/1584; H02M 2003/1586
See application file for complete search history.

(56) References Cited

U.S. PATENT DOCUMENTS 6,144,194 A * 11/2000 Varga ...................... H02M 1/44
                                                    323/269
6,683,441 B2 * 1/2004 Schiff ................. H02M 3/1584
                                                    323/222

(Continued)

FOREIGN PATENT DOCUMENTS

JP        2003284333 A     10/2003
JP        2005515367 A      5/2005

(Continued)

OTHER PUBLICATIONS

International Preliminary Report on Patentability and Written Opinion for corresponding PCT Application No. PCT/JP2016/066960, 17 pages, dated Oct. 11, 2018.

(Continued)

*Primary Examiner* — Kyle J Moody
(74) *Attorney, Agent, or Firm* — Matthew B. Dernier, Esq.

(57) ABSTRACT

There is provided a DC/DC converter that can eliminate the necessity of current sense resistors to thereby reduce the mounting area, improve the efficiency, and realize favorable transient characteristics. A multi-phase DC/DC converter with N phases (N is an integer equal to or greater than 2) is provided. A high-side transistor MH, a low-side transistor ML, and an inductor L are provided for each phase φ. Output power supply wiring connects a load side end of each of N inductors L1 to LN and a load. The output power supply wiring is branched from the load toward the load side ends of the N inductors L1 to LN. A coil current flowing through an inductor Li of an ith phase $\varphi_i$ (i=1, 2, . . . N) is detected based on a voltage drop Vsi of a branch portion bri corresponding to the phase $\varphi_i$ of the output power supply wiring.

13 Claims, 8 Drawing Sheets

(56) References Cited

U.S. PATENT DOCUMENTS

| | | | |
|---|---|---|---|
| 6,891,736 B2* | 5/2005 | Takemura | H02M 3/1584 |
| | | | 363/65 |
| 7,118,316 B2 | 10/2006 | Gombert | |
| 7,122,995 B2* | 10/2006 | Hasegawa | H02M 3/1584 |
| | | | 323/272 |
| 8,400,778 B2* | 3/2013 | Hsing | H01R 9/00 |
| | | | 361/772 |
| 8,552,704 B2* | 10/2013 | Kiadeh | H02M 3/1584 |
| | | | 323/285 |
| 8,836,305 B2 | 9/2014 | Sasao | |
| 2003/0185025 A1 | 10/2003 | Takemura | |
| 2005/0141984 A1 | 6/2005 | Gombert | |
| 2006/0164050 A1 | 7/2006 | Hasegawa | |
| 2013/0200869 A1 | 8/2013 | Sasao | |
| 2014/0265563 A1* | 9/2014 | Schrader | H02J 1/00 |
| | | | 307/18 |
| 2015/0008890 A1* | 1/2015 | Sasao | H02M 1/08 |
| | | | 323/271 |

FOREIGN PATENT DOCUMENTS

| | | |
|---|---|---|
| JP | 2006211815 A | 8/2006 |
| JP | 2007236126 A | 9/2007 |
| JP | 2013162585 A | 8/2013 |

OTHER PUBLICATIONS

International Search Report fo corresponding PCT Application No. PCT/JP2016/066960, 3 pages, dated Aug. 2, 2016.

* cited by examiner

DC/DC CONVERTER

TECHNICAL FIELD

The present invention relates to a direct current (DC)/DC converter.

BACKGROUND ART

A DC/DC converter (switching regulator) that reduces a DC voltage of a certain level to a level optimal for a load is used in an electronic device, such as a laptop or desktop computer, a game machine, a tablet PC, and a smartphone. In addition, a multi-phase converter is used as a power source of a high-performance processor.

Figure 1:
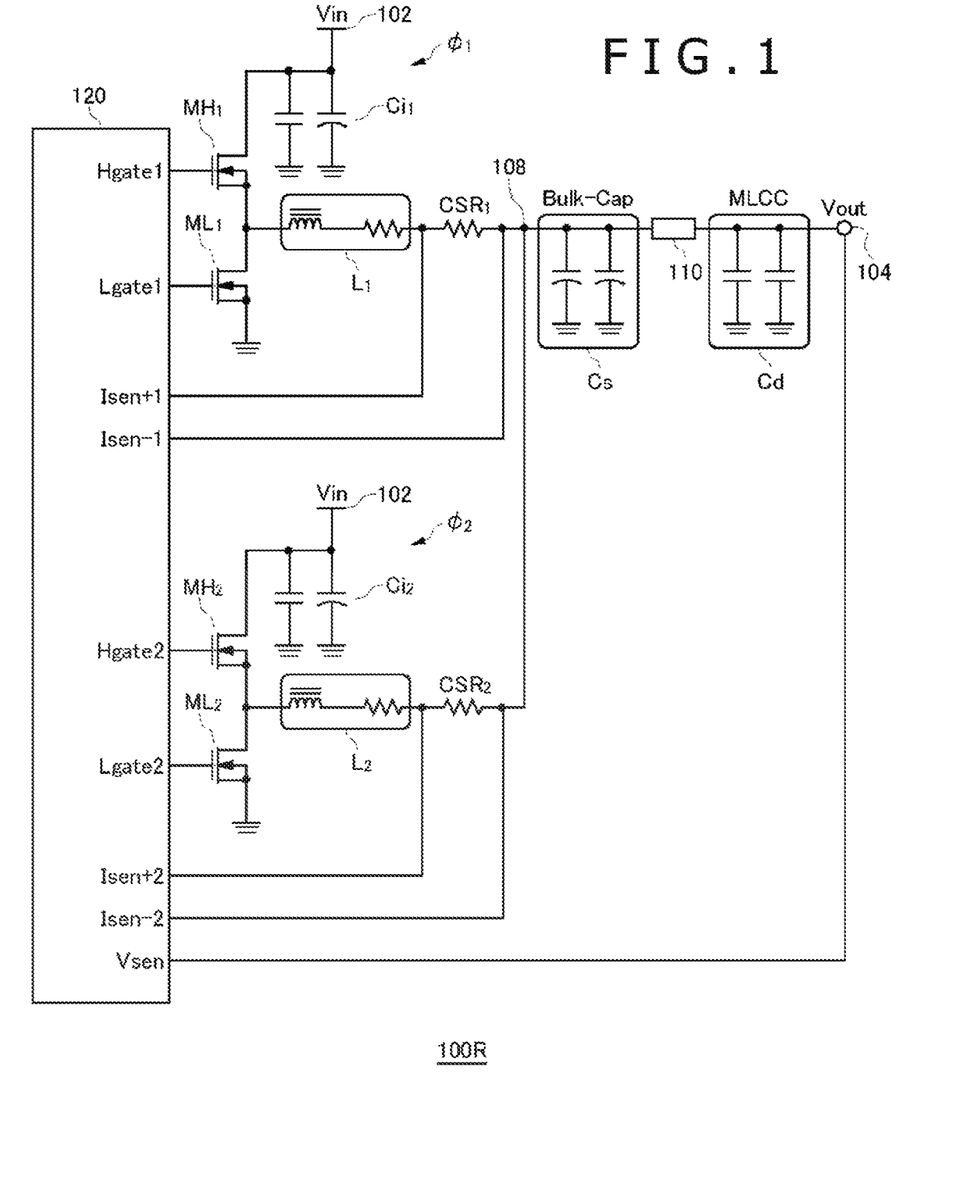
FIG. 1 is a circuit diagram illustrating a multi-phase DC/DC converter.

FIG. 1 is a circuit diagram illustrating a multi-phase DC/DC converter 100r. Two channels are connected in parallel, and the phase is shifted to operate the DC/DC converter. This can increase a pseudo apparent switching frequency to quickly follow the load variation of the processor operating at a high speed.

The DC/DC converter 100r receives an input voltage Vin through an input terminal 102, generates an output voltage Vout obtained by reducing the input voltage Vin and stabilizing the voltage at a target voltage, and supplies the output voltage Vout to a load (not illustrated) such as a processor connected to an output terminal 104.

The DC/DC converter 100r includes two phases, and each phase includes an input capacitor Ci, a high-side transistor MH, a low-side transistor ML, and an inductor L. A subscript indicating a phase number is provided to each circuit element. Outputs of a plurality of phases $\varphi_1$ and $\varphi_2$ are commonly connected, and a common connection point 108 and the output terminal 104 are connected through output power supply wiring 110. A smoothing capacitor Cs is connected to the output power supply wiring 110 at a position close to the common connection point 108, and a decoupling capacitor Cd is connected to the output power supply wiring 110 at a position close to the output terminal 104. Each of the smoothing capacitor Cs and the decoupling capacitor Cd may be a bulk capacitor (Bulk-Cap) or a multilayer ceramic capacitor (MLCC).

The output voltage Vout is fed back to a sense pin (Vsen) of a controller 120. The controller 120 performs feedback control of the plurality of phases $\varphi_1$ and $\varphi_2$ to bring the output voltage Vout close to a target voltage Vref.

The controller 120 monitors, in addition to the output voltage Vout, a coil current Icoil flowing through the inductor L of each phase in order to uniformly operate the plurality of phases or to protect an overcurrent.

In the DC/DC converter 100r of FIG. 1, a current sense resistor $CSR_i$ is inserted in series with the inductor $L_i$ in each phase $\varphi_i$, and voltages at both ends of the current sense resistor $CSR_i$ are input to Isen+ and Isen− pins of the controller 120, respectively. The controller 120 detects the coil current Icoil based on a potential difference between the Isen+ and Isen− pins, that is, a voltage drop of the current sense resistor $CSR_i$.

Figure 2:
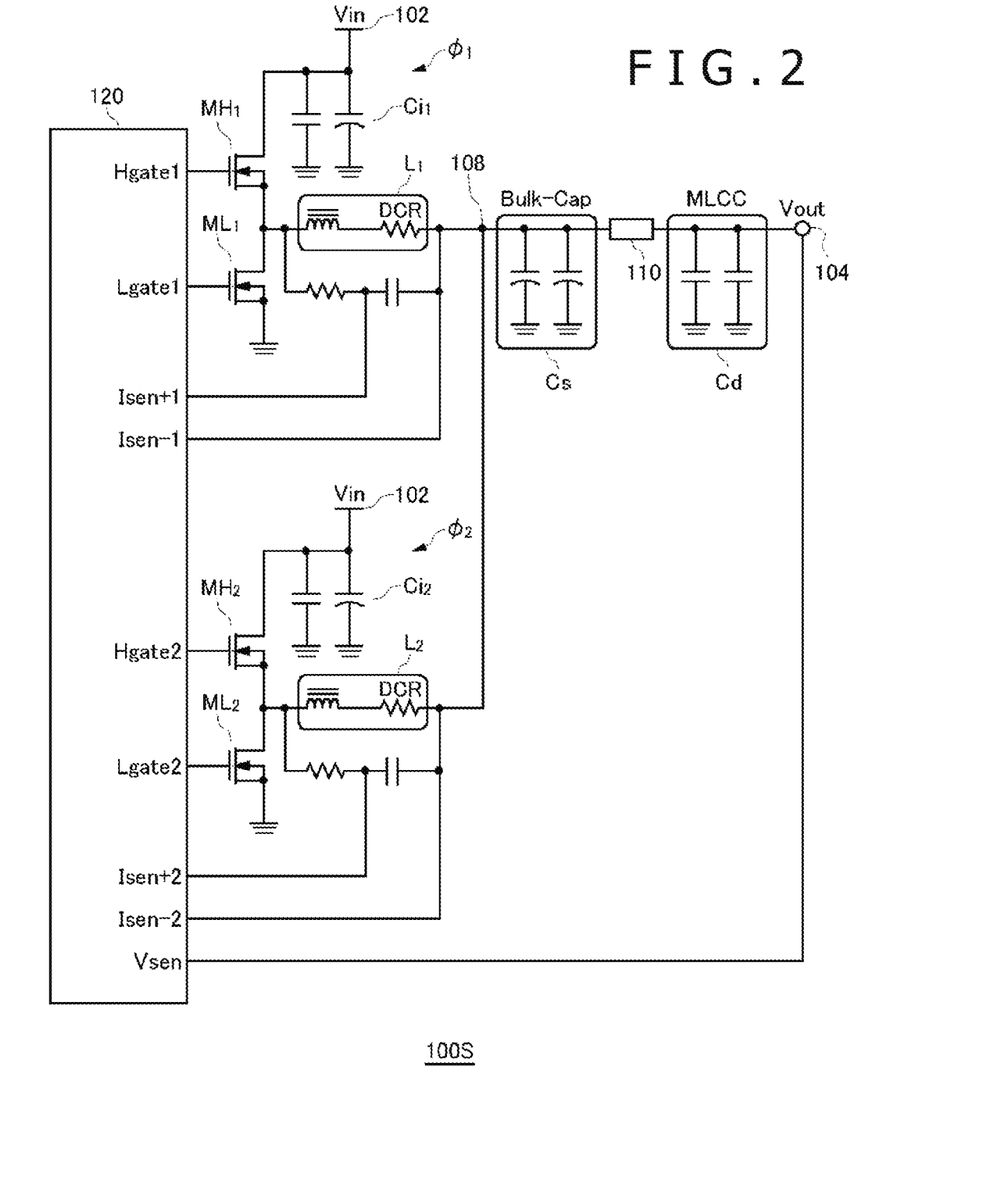
FIG. 2 is a circuit diagram illustrating another multi-phase DC/DC converter.

FIG. 2 is a circuit diagram illustrating another multi-phase DC/DC converter 100s. The system of current sense of the DC/DC converter 100s is different from that of FIG. 1. The current sense resistors CSR of FIG. 1 are eliminated, and DC resistances (parasitic series resistances) DCR of the inductors L are used instead. A related technique is described in PTL 2. Specifically, a CR filter 106 is provided in parallel with the inductor $L_i$ in each phase $\varphi_i$, and voltages at both ends of the capacitor are input to the Isen+ and Isen− pins of the controller 120, respectively.

CITATION LIST

Patent Literature

[PTL 1] JP 2005-515367A [PTL 2] JP 2013-162585A

SUMMARY

Technical Problem

Figure 3:
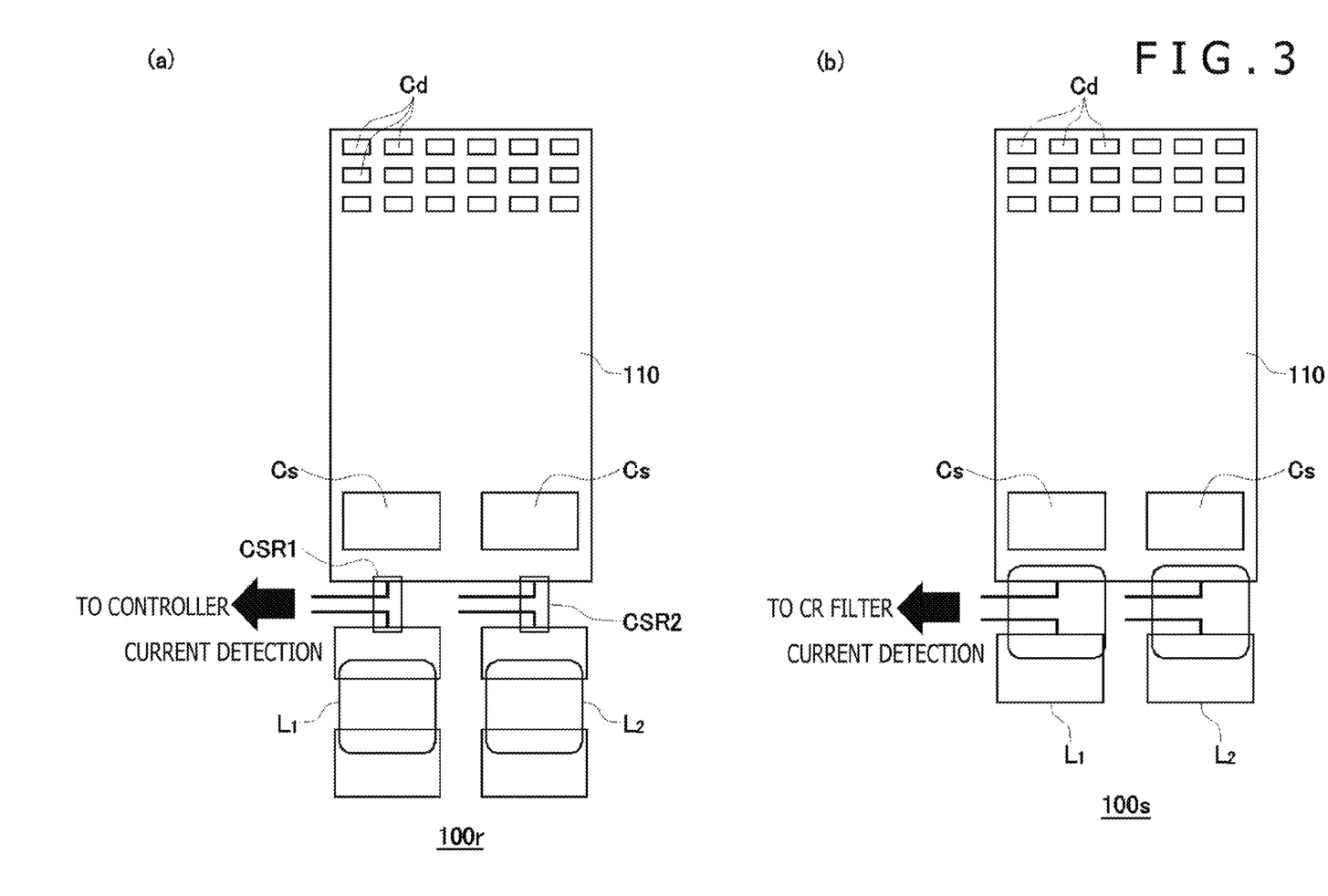
FIG. 3(a) is a diagram illustrating a layout of the DC/DC converter of FIG. 1 on a printed board.
FIG. 3(b) is a diagram illustrating a layout of the DC/DC converter of FIG. 2 on a printed board.

As a result of verification of the DC/DC converter of FIG. 1 or FIG. 2, the present inventor has come to recognize the following problems. FIG. 3(a) is a diagram illustrating a layout of the DC/DC converter of FIG. 1 on a printed board, and FIG. 3(b) is a diagram illustrating a layout of the DC/DC converter of FIG. 2 on a printed board.

In the current detection system of FIG. 1, manufacturing variations of resistance values of the current sense resistors CSR are small, and the temperature dependence is small. Therefore, highly accurate current detection is possible. In addition, because the voltage drop indicates the coil current Icoil, the configuration of the detection circuit can be simple. On the other hand, the current sense resistors CSR as chip components are expensive, and as illustrated in FIG. 3(a), there is a problem of an increase in the number of components and the mounting area of the chip components. In addition, the current sense resistors CSR are losses which lead to a reduction in the efficiency, and there is a problem of degradation in the transient characteristics.

In the current detection system of FIG. 2, the current sense resistors CSR are not necessary. Therefore, the mounting area can be small as illustrated in FIG. 3(b), and the cost can be reduced. In addition, there is no loss caused by the current sense resistors CSR, and the current detection system is superior in terms of efficiency and transient characteristics. On the other hand, variations in the resistors DCR of the inductors L are large in the system, and the temperature dependence is also large. Therefore, the system is inferior in terms of current detection accuracy. In addition, the CR filter 106 is necessary, and the configuration of the detection circuit is complicated.

The present invention has been made in view of the problems, and an exemplary object of an aspect of the present invention is to provide a DC/DC converter that solves the problems of the conventional current detection systems.

Solution to Problem

An aspect of the present invention relates to a multi-phase DC/DC converter with N phases (N is an integer equal to or greater than 2). The DC/DC converter includes: a high-side transistor, a low-side transistor, and an inductor provided for each phase; and output power supply wiring that connects a load side end of each of N inductors and a load. The output power supply wiring is branched from the load toward the load side ends of the N inductors, and a coil current flowing through the inductor of each phase is detected based on a voltage drop of a branch portion corresponding to the phase of the output power supply wiring.

According to the aspect, the current sense resistors are not necessary. This can reduce the mounting area, improve the efficiency, and realize favorable transient characteristics. In addition, the voltage drop of the branch portion is proportional to the coil current, and the detection circuit can also be simple. Furthermore, the output power supply wiring is positioned at a place farther from the high-side transistor and the low-side transistor as heating elements than from the inductor. Therefore, compared to the case of using the internal resistance of the inductor, the temperature dependence can be reduced, and highly accurate current detection is possible.

Two adjacent phases of the N phases may share a voltage detection point on the load side of the branch portions. This can simplify the wiring compared to the case of detecting the voltage drop at two terminals for each branch portion.

Resistance values of N branch portions of the N phases may be equal. This can simplify signal processing by a controller of the DC/DC converter.

When virtual power supply wiring that does not include branching and that connects the load side end of each of the N inductors and the load is defined, the output power supply wiring may have a shape in which a slit is formed in the virtual power supply wiring from between adjacent inductors toward the load.

A first output capacitor for each phase may be connected to each of the N branch portions of the output power supply wiring. A second output capacitor common to all phases may be connected to a merge portion on the load side of the output power supply wiring.

The output power supply wiring may be multilayer wiring and may be branched in each layer. The multilayering can lower the impedance of the output power supply wiring. In addition, for each phase, the resistance value of combined impedance of the branch portions of the same phase in a plurality of layers can be used to detect the coil current.

Note that an arbitrary combination of the constituent elements and expression of the present invention converted between a method, an apparatus, a system, and the like are also effective as aspects of the present invention.

Advantageous Effect of Invention

According to the present invention, the coil current of each phase can be detected.

DESCRIPTION OF EMBODIMENT

Hereinafter, the present invention will be described with reference to the drawings based on a preferred embodiment. The same reference signs are provided to the same or equal constituent elements, members, and processes illustrated in the drawings, and overlapping description will be appropriately omitted. In addition, the embodiment is illustrative and does not limit the invention. All features and combinations of the features described in the embodiment may not be essential to the invention.

In the present specification, a "state in which a member A and a member B are connected" includes a case in which the member A and the member B are physically and directly connected and a case in which the member A and the member B are indirectly connected through another member that does not affect the electrical connection state or that does not inhibit the function.

Similarly, a "state in which a member C is provided between a member A and a member B" includes a case in which the member A and the member C or the member B and the member C are directly connected and a case in which they are indirectly connected through another member that does not affect the electrical connection state or that does not inhibit the function.

Figure 4:
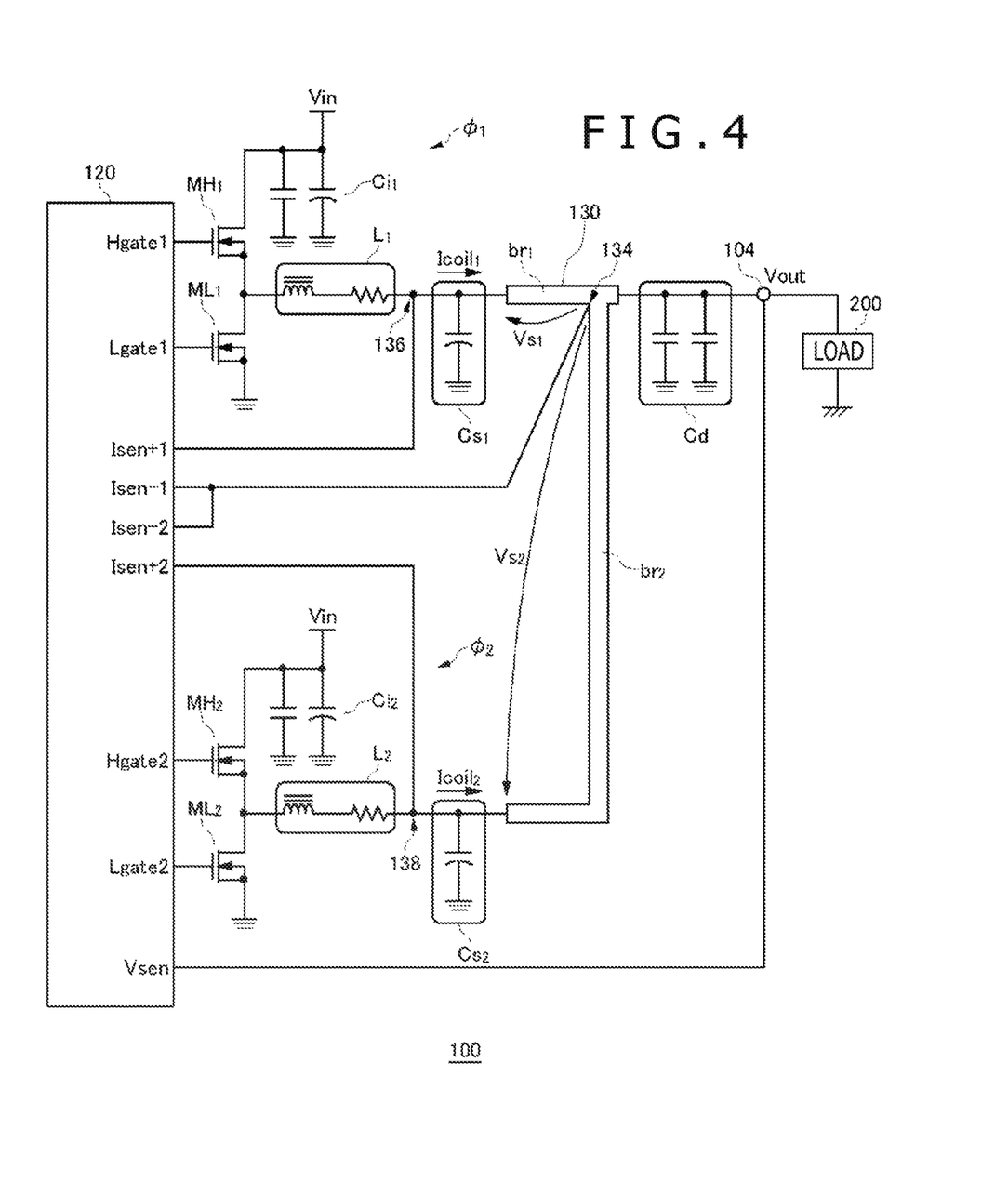
FIG. 4 is a circuit diagram of a multi-phase DC/DC converter with N phases according to an embodiment.

FIG. 4 is a circuit diagram of a multi-phase DC/DC converter 100 with N phases (N is an integer equal to or greater than 2) according to the embodiment. To facilitate the understanding and simplify the description, N equals to 2 in the present embodiment. The DC/DC converter 100 receives an input voltage Vin through an input terminal 102, generates an output voltage Vout by reducing the input voltage Vin and stabilizing the voltage at a target voltage, and supplies the output voltage Vout to a load 200, such as a processor connected to an output terminal 104.

The DC/DC converter 100 includes a high-side transistor MH, a low-side transistor ML, and an inductor L provided for each phase φ and includes a controller 120, output power supply wiring 130, some input capacitors Ci, and some output capacitors Cs and Cd.

The output power supply wiring 130 connects a load side end of each of N inductors $L_1$ to $L_N$ and the load 200. The output power supply wiring 130 is branched from the load 200 toward the load side ends of the N inductors $L_1$ to $L_N$. In other words, N branch portions $br_1$ to $br_N$ corresponding to N phases merge on the load side. As described later, the output power supply wiring 130 includes printed wiring formed on a printed board.

In the present embodiment, first output capacitors $Cs_1$ to $Cs_N$ for each phase are connected to the branch portions $br_1$ to $br_N$ of the output power supply wiring 130, respectively. Each first output capacitor $Cs_i$ may be a bulk capacitor and is connected to an end portion on the upstream (inductor side) of the corresponding branch portion $br_i$. In addition, a second output capacitor Cd common to all phases is connected to a merge portion on the load 200 side of the output power supply wiring 130. The second output capacitor Cd may be a multilayer ceramic capacitor.

The voltages at both ends (voltage detection points) of the branch portion $br_1$ of a first phase $φ_1$ are input to Isen+1 and Isen−1 pins of the controller 120, and the voltages at both ends (voltage detection points) of the branch portion $br_2$ of a second phase $φ_2$ are input to Isen+2 and Isen−2 pins of the controller 120. In addition, a coil current $Icoil_i$ flowing through an inductor $L_i$ of an ith phase $φ_i$ is detected based on a voltage drop $Vs_i$ of the branch portion $br_i$ corresponding to the phase $φ_i$ of the output power supply wiring 130.

Assuming that the impedance (DC resistance) of the branch portion $br_i$ of the ith phase $φ_i$ is $R_i$, the voltage drop $Vs_i$ is provided by Formula (1). The DC resistance $R_i$ of each branch portion $br_i$ is equivalent to the parasitic resistance of wiring of the printed board.

$$Vs_i = R_i \times Icoil_i \quad (1)$$

Therefore, the DC resistance $R_i$ can be measured in advance or can be calculated by simulation in advance to detect the coil current $Icoil_i$ based on the voltage drop $Vs_i$ according to Formula (2).

$$Icoil_i = Vs_i / R_i \quad (2)$$

Note that depending on the shape of the output power supply wiring 130, some current flows into the load 200 without passing through a voltage detection point 134. In this case, a correction coefficient α may be introduced to calculate the coil current $Icoil_i$ based on Formula (3).

$$Icoil_i = Vs_i / (\alpha \times R_i) \quad (3)$$

Alternatively, a resistance value equivalent to $\alpha \times R_i$ may be calculated based on simulation or the like or may be actually measured.

It is preferable that the DC resistances $R_1$ to $R_N$ of the phases be equal. This eliminates the necessity of a process of correcting the resistance value in the controller 120.

The configuration of the DC/DC converter 100 has been described. According to the DC/DC converter 100 of FIG. 4, the current sense resistors CSR are not necessary, unlike in the DC/DC converter 100R of FIG. 1. Therefore, the cost can be reduced, and the mounting area can be reduced. Furthermore, the efficiency can be improved, and favorable transient characteristics can be realized.

In addition, the voltage drop Vs of the branch portion br is proportional to the coil current Icoil. Therefore, the voltage drop Vs can be handled in the same way as the current sense resistor CSR of the DC/DC converter 100R of FIG. 1, and the detection circuit can also be simple. Furthermore, the output power supply wiring 130 is positioned at a place farther from the high-side transistors MH and the low-side transistors ML as heating elements than from the inductors L. Therefore, compared to the case of using the DC resistances DCR of the inductors L, the temperature dependence can be reduced, and highly accurate current detection is possible.

Figure 5:
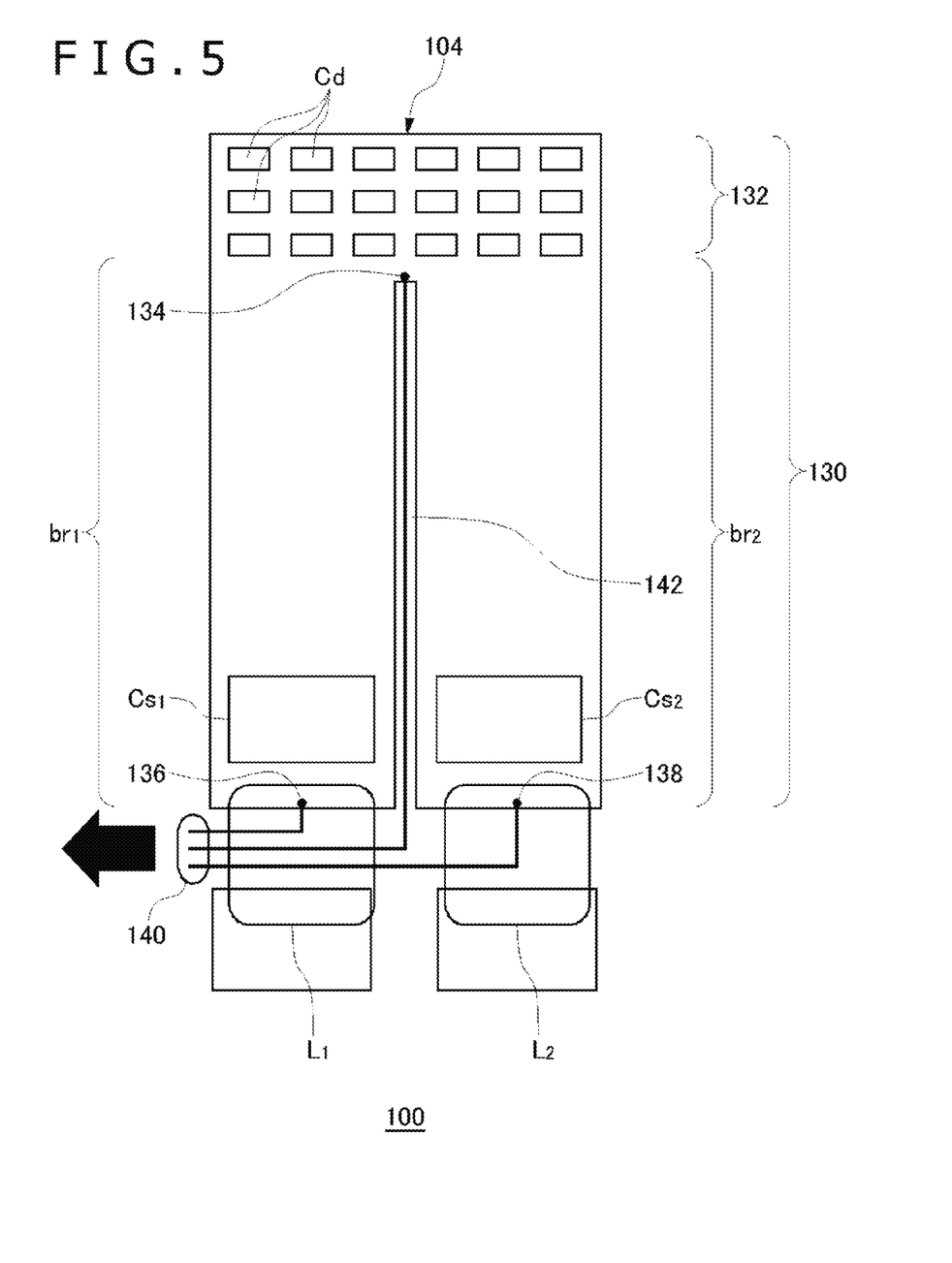
FIG. 5 is a diagram illustrating a layout of the DC/DC converter of FIG. 4 on a printed board.

FIG. 5 is a diagram illustrating a layout of the DC/DC converter 100 of FIG. 4 on a printed board. As described above, the output power supply wiring 130 includes a plurality of branch portions $br_1$ and $br_2$, and the branch portions $br_1$ and $br_2$ are merged on the output terminal 104 side (load 200). To simplify the description, it is assumed here that the output power supply wiring 130 is single-layer wiring.

The first output capacitors $Cs_1$ and $Cs_2$ are connected to end portions on the upstream of the corresponding branch portions $br_1$ and $br_2$, respectively. In addition, a plurality of second output capacitors Cd common to all phases are connected to a merge portion 132 on the load 200 side of the output power supply wiring 130. Note that although one end of each of the first output capacitors Cs and the second output capacitors Cd is connected to ground wiring (ground plane) instead of the output power supply wiring 130 in FIG. 5 (or FIGS. 3(a) and 3(b)), the connection to the ground wiring is not illustrated in order to simplify the drawings.

Two adjacent phases $\varphi_1$ and $\varphi_2$ of the N phases share the voltage detection point 134 on the load side of the branch portions $br_1$ and $br_2$. The coil current $Icoil_1$ of the first phase $\varphi_1$ is detected according to the voltage drop between the voltage detection point 134 on the load side of the branch portion $br_1$ and a voltage detection point 136 on the upstream (inductor $L_1$ side), and the coil current $Icoil_2$ of the second phase $\varphi_2$ is detected according to the voltage drop between the voltage detection point 134 on the load side of the branch portion $br_2$ and a voltage detection point 138 on the upstream (inductor $L_2$ side).

Four sense wires 140 drawn out from the voltage detection points would be necessary in the case of detecting the voltage drop at two terminals for each of the branch portions $br_1$ and $br_2$. However, sharing the voltage detection point 134 on the load side can reduce the number of sense wires 140 to three and can simplify the configuration. Note that the sense wires 140 may be formed in the same wiring layer as the output power supply wiring 130 or may be formed in another wiring layer.

In FIG. 5, the output power supply wiring 130 is symmetrically formed in a plurality of phases, and therefore, the resistance values $R_1$ and $R_2$ of the N branch portions $br_1$ and $br_2$ are equal. This can simplify the signal processing by the controller of the DC/DC converter.

The feature of the DC/DC converter 100 according to the embodiment becomes clearer by comparing FIG. 5 with FIGS. 3(a) and 3(b). The output power supply wiring 110 is not divided for each phase in the conventional DC/DC converters 100r and 100s, and the first output capacitor (smoothing capacitor) Cs is also common to all phases. On the other hand, the output power supply wiring 130 is branched and formed for each phase in the present embodiment, and this allows to measure the coil current of each channel.

Next, the design of the output power supply wiring 130 will be described. First, virtual power supply wiring that does not include branching and that connects the load side end of each of the N inductors $L_1$ to $L_N$ and the load (output terminal 104) is defined. The virtual power supply wiring is just equivalent to the output power supply wiring 110 of FIG. 3(b). The output power supply wiring 130 is then formed into a shape in which a slit 142 is provided in the virtual power supply wiring 110 from between the adjacent inductors $L_1$ and $L_2$ toward the load (output terminal 104). Although the slit 142 illustrated in FIG. 5 is a straight line, the slit 142 is not limited to this. The slit 142 may be bent or may include a curve.

According to the method, the respective DC resistances $R_1$ and $R_2$ of the branch portions $br_1$ and $br_2$ can be designed according to the width and the shape of the slit 142.

Figure 6:
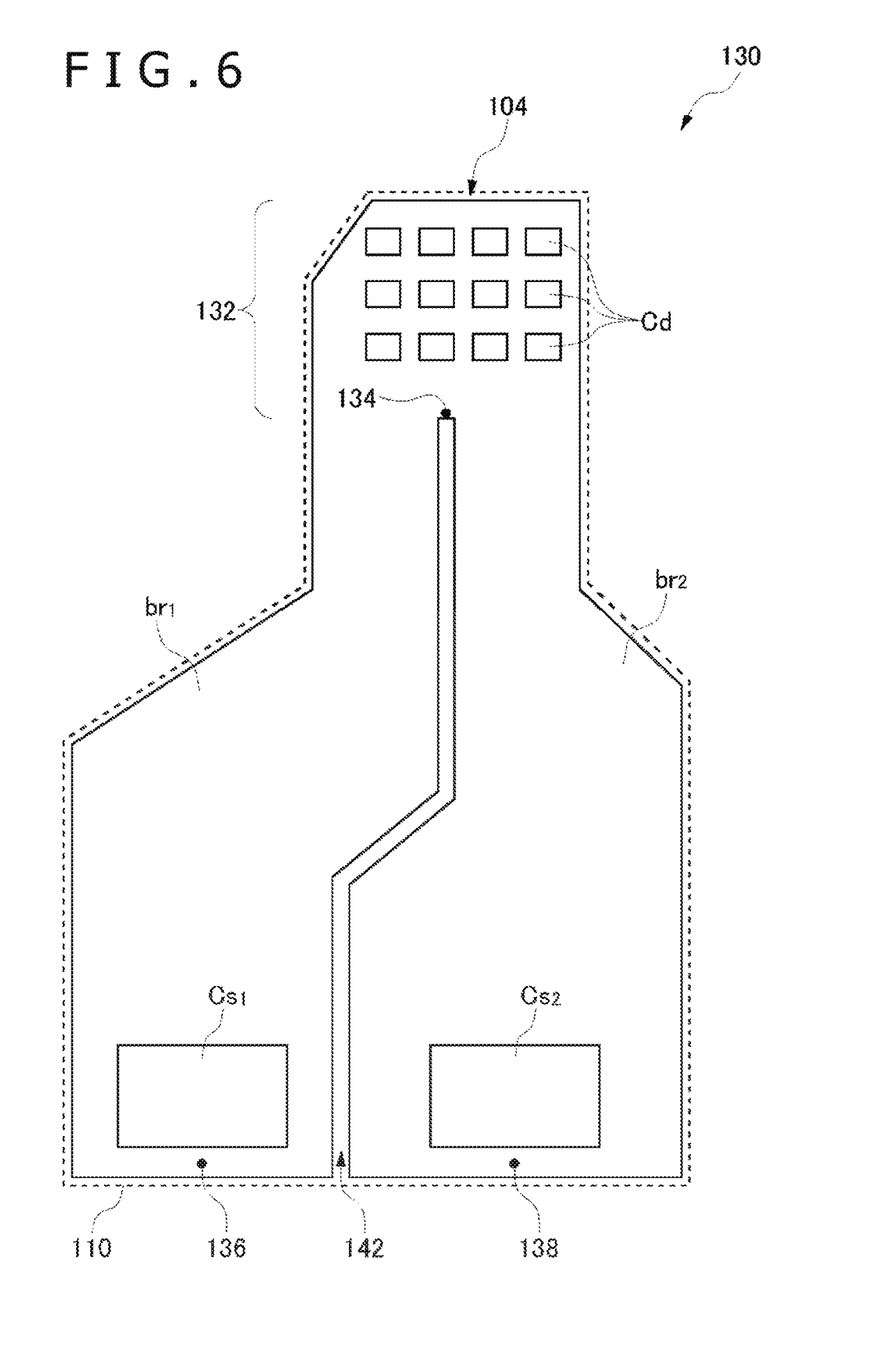
FIG. 6 is a diagram illustrating another example of output power supply wiring.

In the actual design of the set (electronic device), it is often difficult to lay out the output power supply wiring 130 and the inductors $L_1$ and $L_2$ to make the plurality of phases symmetrical as illustrated in FIG. 5. FIG. 6 is a diagram illustrating another example of the output power supply wiring 130. The impedance needs to be low in the output power supply wiring 130, and the output power supply wiring 130 is designed as widely as possible. However, the width on the output terminal 104 side is restricted by the pin configuration of the load 200. Therefore, the width of the output power supply wiring 130 is tapered toward the output terminal 104 as illustrated in FIG. 6.

The virtual power supply wiring 110 can also be defined in the output power supply wiring 130, and the slit 142 can be provided in the virtual power supply wiring 110 to form two branch portions $br_1$ and $br_2$. Trial and error based on simulation and/or actual measurement is then conducted to optimize the shape and the position of the slit 142 to equalize the DC resistance $R_1$ between the voltage detection point 134 and the voltage detection point 136 and the DC resistance $R_2$ between the voltage detection point 134 and the voltage detection point 138. The voltage detection point 134 can be provided near the top of the slit 142, and the part of the slit 142 can be used to route the sense wire 140. However, the present invention is not limited to this, and the voltage detection point 134 can be provided at any place of the merge portion 132.

The present invention has been described based on the embodiment. The embodiment is illustrative, and it will be understood by those skilled in the art that the combinations of the constituent elements and the processes can be modified in various ways and that the modifications are also within the scope of the present invention. Hereinafter, the modifications will be described.

(First Modification)

The main ingredient of the output power supply wiring 130 is copper in many cases, and the resistivity is dependent on temperature. As described above, the output power supply wiring 130 is away from the high-side transistors MH and the low-side transistors ML that are heating elements, and the output power supply wiring 130 is unlikely to be affected by the change in temperature. However, in a case where the processor as a load generates a large amount of heat, the DC resistances $R_1$ and $R_2$ of the branch portions $br_1$ and $br_2$ of the output power supply wiring 130 may be dependent on temperature in a level that cannot be ignored.

Figure 7:
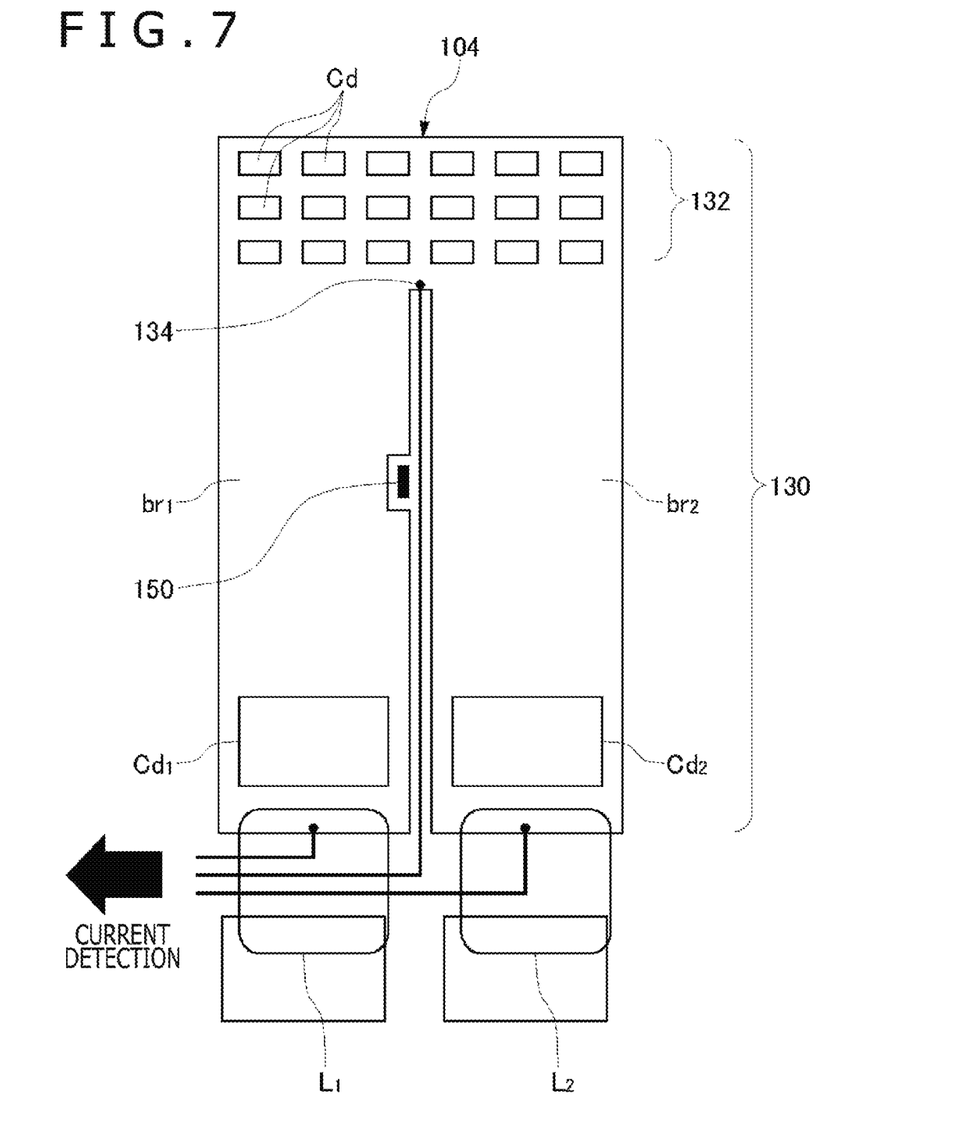
FIG. 7 is a layout diagram of part of a DC/DC converter according to a first modification.

FIG. 7 is a layout diagram of part of a DC/DC converter 100a according to a first modification. The DC/DC converter 100a includes a temperature sensor 150 that measures the temperature of the branch portions $br_1$ and $br_2$ of the output power supply wiring 130. A thermistor or a thermocouple can be used as the temperature sensor 150. It is desirable to arrange the temperature sensor 150 at the part of the slit 142 of the output power supply wiring 130, and this allows to detect the temperature of both of the two branch portions $br_1$ and $br_2$. Temperature detection signals as outputs of the temperature sensor 150 are input to the controller 120. The controller 120 corrects the DC resistances $R_1$ and $R_2$ based on the temperature detection signals. This can improve the temperature dependence of the current detection accuracy.

(Second Modification)

Figure 8:
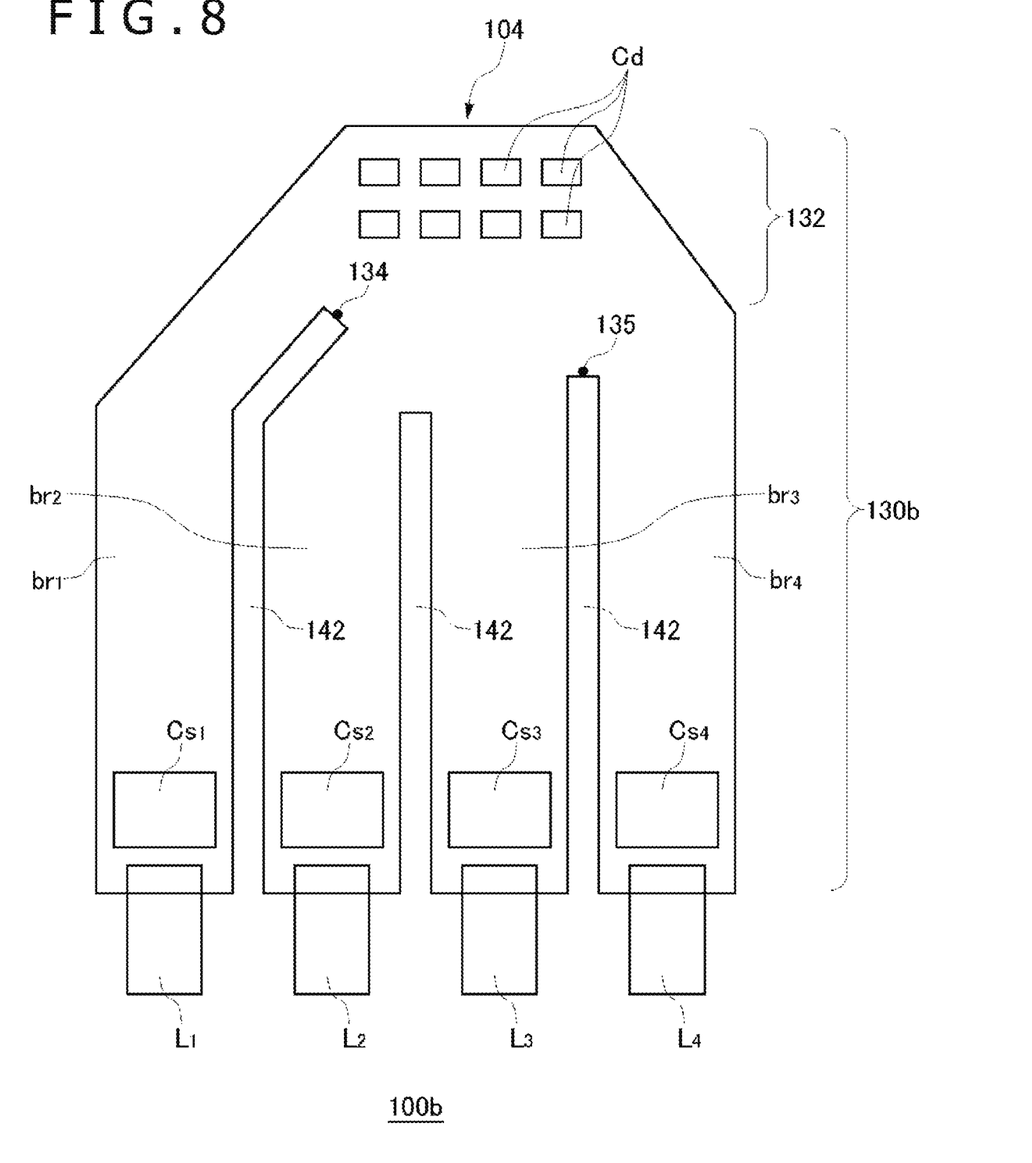
FIG. 8 is a layout diagram of part of a DC/DC converter with 4 phases.

Although N equals to 2 phases in the description of the embodiment, the number of phases N is not limited to this, and the number of phases N may be an arbitrary number, such as N=3, 4, 6, 8, 10, and 12. FIG. 8 is a layout diagram of part of a DC/DC converter 100b with 4 phases. An output power supply wiring 130b includes the merge portion 132 and four branch portions $br_1$ to $br_4$ corresponding to the 4 phases. The slits 142 are formed between two adjacent branch portions br. The voltage detection point 134 on the output terminal 104 side of the branch portions $br_1$ and $br_2$ is shared, and a voltage detection point 135 on the output terminal 104 side of the branch portions $br_3$ and $br_4$ is shared.

(Third Modification)

Although the output power supply wiring 130 is single-layer wiring in the description of the embodiment, the output power supply wiring 130 may be multilayer wiring. In this case, the output power supply wiring 130 may be branched in each layer. The multilayering can lower the impedance of the output power supply wiring 130. In addition, for each phase, the resistance value of combined impedance of the branch portions of the same phase in a plurality of layers can be used to detect the coil current.

(Fourth Modification)

One of the first output capacitors Cs and the second output capacitors Cd in FIG. 4 may be eliminated.

The present invention has been described based on the embodiment. The embodiment is illustrative, and it will be understood by those skilled in the art that the combinations of the constituent elements and the processes can be modified in various ways and that the modifications are also within the scope of the present invention.

REFERENCE SIGNS LIST

100 . . . DC/DC converter, $MH_1$, $MH_2$ . . . High-side transistors, $ML_1$, $ML_2$ . . . Low-side transistors, $L_1$, $L_2$ . . . Inductors, $Cs_1$, $Cs_2$ . . . First output capacitors, Cd . . . Second output capacitor, Cil, Cie . . . Input capacitors, 102 . . . Input terminal, 104 . . . Output terminal, 108 . . . Common connection point, 130 . . . Output power supply wiring, 132 . . . Merge portion, br . . . Branch portion, 134 . . . Voltage detection point, 136 . . . Voltage detection point, 140 . . . Sense wire, 142 . . . Slit, 200 . . . Load.

INDUSTRIAL APPLICABILITY

The present invention can be used for a power supply circuit.

What is claimed is:

1. A multi-phase DC/DC converter with N phases (N is an integer equal to or greater than 2), the DC/DC converter comprising:
   a high-side transistor, a low-side transistor, and an inductor provided for each phase; and
   output power supply wiring that connects a load side end of each of N inductors and a load, wherein the output power supply wiring includes a respective segment of wiring from the load toward each respective load side end of each of the N inductors, and
   a respective coil current flowing through each of the N inductors is detected based on a respective voltage drop across each respective segment of wiring of the output power supply wiring,
   wherein the output power supply wiring is formed of a printed circuit board trace having a slit extending from between an adjacent pair of the N inductors toward the load, and wherein the slit terminates at a common voltage detection point at the load to which each of the respective segments of wiring are connected.

2. The DC/DC converter according to claim 1, wherein two adjacent phases of the N phases share a common voltage detection point at the load to which each of the respective segments of wiring are connected.

3. The DC/DC converter according to claim 1, wherein respective parasitic resistance values of each of the respective segments of wiring are equal.

4. The DC/DC converter according to claim 1, wherein a respective first output capacitor for each phase is connected to each load side end of the N inductors.

5. The DC/DC converter according to claim 1, wherein a second output capacitor common to all phases is connected to a merge portion on the load side of the output power supply wiring.

6. The DC/DC converter according to claim 1, wherein the output power supply wiring is multilayer wiring and is branched in each layer.

7. A multi-phase DC/DC converter with N phases (N is an integer equal to or greater than 2), the DC/DC converter comprising:
   a high-side transistor, a low-side transistor, and an inductor provided for each phase; and output power supply wiring that connects a load side end of each of N inductors and a load, wherein the output power supply wiring includes a respective segment of wiring directly connecting the load to each respective load side end of each of the N inductors, and a respective coil current flowing through each of the N inductors is detected based on a respective voltage drop across each respective segment of wiring of the output power supply wiring, wherein the output power supply wiring is formed of a printed circuit board trace having a slit extending from between an adjacent pair of the N inductors toward the load, and wherein the slit terminates at a common voltage detection point at the load to which each of the respective segments of wiring are connected.

8. The DC/DC converter according to claim 7, wherein two adjacent phases of the N phases share a common voltage detection point at the load to which each of the respective segments of wiring are connected.

9. The DC/DC converter according to claim 7, wherein respective parasitic resistance values of each of the respective segments of wiring are equal.

10. The DC/DC converter according to claim 7, wherein a respective first output capacitor for each phase is connected to each load side end of the N inductors.

11. The DC/DC converter according to claim 7, wherein a second output capacitor common to all phases is connected to a merge portion on the load side of the output power supply wiring.

12. The DC/DC converter according to claim 7, wherein the output power supply wiring is multilayer wiring and is branched in each layer.

13. A multi-phase DC/DC converter with N phases (N is an integer equal to or greater than 2), the DC/DC converter comprising:

a high-side transistor, a low-side transistor, and an inductor provided for each phase; and output power supply wiring that connects a load side end of each of N inductors and a load, wherein the output power supply wiring includes a respective segment of wiring connecting the load to each respective load side end of each of the N inductors, and wherein the connecting includes one of: (i) a case in which the load and each respective load side end of each of the N inductors are physically and directly connected, and (ii) a case in which the load and each respective load side end of each of the N inductors are indirectly connected through another member that does not affect an electrical connection state or that does not inhibit function of the DC/DC converter; and a respective coil current flowing through each of the N inductors is detected based on a respective voltage drop across each respective segment of wiring of the output power supply wiring, wherein the output power supply wiring is formed of a printed circuit board trace having a slit extending from between an adjacent pair of the N inductors toward the load, and wherein the slit terminates at a common voltage detection point at the load to which each of the respective segments of wiring are connected.

* * * * *